(12) United States Patent
Eriksson

(10) Patent No.: US 12,040,105 B2
(45) Date of Patent: Jul. 16, 2024

(54) BUSHING FOR A POWER SYSTEM

(71) Applicant: Hitachi Energy Ltd, Zurich (CH)

(72) Inventor: Göran Eriksson, Västerås (SE)

(73) Assignee: HITACHI ENERGY LTD, Zurich (CH)

( * ) Notice: Subject to any disclaimer, the term of this patent is extended or adjusted under 35 U.S.C. 154(b) by 488 days.

(21) Appl. No.: 17/296,951

(22) PCT Filed: Nov. 26, 2019

(86) PCT No.: PCT/EP2019/082579
§ 371 (c)(1),
(2) Date: May 25, 2021

(87) PCT Pub. No.: WO2020/109299
PCT Pub. Date: Jun. 4, 2020

(65) Prior Publication Data
US 2022/0028584 A1  Jan. 27, 2022

(30) Foreign Application Priority Data
Nov. 29, 2018 (EP) .................................... 18209287

(51) Int. Cl.
*H01G 4/32* (2006.01)
*H01B 17/28* (2006.01)

(52) U.S. Cl.
CPC ............... *H01B 17/28* (2013.01); *H01G 4/32* (2013.01)

(58) Field of Classification Search
CPC . H01G 4/32; H01G 4/18; H01B 17/28; H10G 4/012
(Continued)

(56) References Cited

U.S. PATENT DOCUMENTS

| 3,331,910 A | * | 7/1967 | Grimmer | ............... H01B 17/28 174/31 R |
| 2009/0268368 A1 | * | 10/2009 | Fuhrmann | ................ H01G 4/32 29/25.42 |
| 2013/0025911 A1 | * | 1/2013 | Borjesson | .............. H01B 17/28 174/143 |

FOREIGN PATENT DOCUMENTS

| CN | 103534766 A | 1/2014 |
| CN | 104201590 A | 12/2014 |

(Continued)

OTHER PUBLICATIONS

Chinese Office Action, Chinese Invention Patent Application No. 2019800749529, Sep. 24, 2021, 4 pages.

(Continued)

*Primary Examiner* — Arun Ramaswamy
(74) *Attorney, Agent, or Firm* — Sage Patent Group

(57) ABSTRACT

A bushing for a power system, comprising: a conductor, and a condenser core, wherein the condenser core comprises a dielectric sheet and a plurality of disjoint regions of electrically conducting material provided on the dielectric sheet, wherein the dielectric sheet and the electrically conducting material form a wound structure around the conductor, wherein in at least one region the electrically conducting material is a semiconducting material, wherein the semiconducting material extends more than one turn around the conductor, whereby the at least one region has overlapping edges in the radial direction, and wherein the dielectric sheet extends between the overlapping edges whereby a capacitance is formed between the overlapping edges, which capacitance is partly defined by an overlap length of the overlapping edges and which capacitance forms part of a resonance circuit of the at least one region, wherein the overlap length is such that the resonance circuit has a (Continued)

resonance frequency contained in a very fast transient, VFT, spectrum.

17 Claims, 1 Drawing Sheet

(58) Field of Classification Search
USPC .................. 361/301.4, 301.5, 301.1, 303
See application file for complete search history.

(56) References Cited

FOREIGN PATENT DOCUMENTS

| | | | |
|---|---|---|---|
| CN | 207114741 U | 3/2018 | |
| EP | 2093777 A1 | 8/2009 | |
| EP | 2180485 A1 * | 4/2010 | ............ H01B 17/28 |
| EP | 2180485 A1 | 4/2010 | |
| EP | 2375423 A1 | 10/2011 | |
| EP | 2541561 A1 | 1/2013 | |
| EP | 2911255 A1 * | 8/2015 | ............ H01B 17/28 |
| EP | 2911255 A1 | 8/2015 | |
| WO | 2014/090677 A1 | 6/2014 | |

OTHER PUBLICATIONS

International Search Report and Written Opinion of the International Searching Authority, PCT/EP2019/082579, mailed Feb. 13, 2020, 10 pages.

* cited by examiner

BUSHING FOR A POWER SYSTEM

CROSS REFERENCE TO RELATED APPLICATIONS

This application is a 35 U.S.C. § 371 national stage application of PCT International Application No. PCT/EP2019/082579 filed on Nov. 26, 2019, which in turns claims foreign priority to European Patent Application No. 18209287.4, filed on Nov. 29, 2018, the disclosures and content of which are incorporated by reference herein in their entirety.

TECHNICAL FIELD

The present disclosure generally relates to bushings for power systems.

BACKGROUND

High voltage bushings of so-called condenser type may have a large number, typically 20-100, of electrically floating metal foils wound concentrically around the central conductor. By additionally making the axial length of the foils a decreasing function of the radial distance from the inner conductor, a smooth potential gradient from the high-voltage inner conductor to the grounded flange can be achieved. In this way harmful discharges due to local overvoltages can be avoided, both inside the bushing as well as on its surface.

Apart from providing the desired field grading at low frequencies, typically 50-1000 Hz, the foil system will also generate resonances at high frequencies, typically in the MHz range. Essentially two types of resonances may exist.
1. Axial resonances, where foil currents are flowing in the axial direction. The small annular volume between two radially neighbouring foils acts as a waveguide. All the different waveguides will couple to each other at their ends, thus forming a set of coupled resonators.
2. Azimuthal resonances, where the foil currents are flowing in the azimuthal direction. The overlap between the two ends of a foil creates a capacitance, which then forms a simple resonance circuit together with the inductance associated with the azimuthal current flowing along the foil from one of its ends to the other. These fundamental circuits, one for each foil, are inductively coupled to each other via their mutual inductances, creating a set of coupled resonators.

The second type of resonances can result in transient overvoltages at the foil overlap gaps, and is therefore thought to be one of the possible reasons for failure in bushings exposed to high very fast transient (VFT) levels in the surrounding transmission system.

One method of handling VFTs is to manually short-circuit each overlap at some positions during the winding process. Another suggested solution is to make the overlap much shorter, or even remove it completely thus replacing it with a gap in the azimuthal direction, as disclosed in EP2541561. In this way the capacitance is decreased and consequently the resonances are shifted to much higher frequencies than those represented in the VFT spectrum. Both methods will prevent the bushing from being damaged but they will not affect the propagation of the VFT transient through the bushing.

A third method that has been devised is to use foils made of metalized paper with very thin conducting layers as disclosed in EP2180485. Due to the resistive damping, attenuation of the VFT should be expected. However, practical issues with the robustness of the extremely thin conducting layers make the concept difficult to realize.

SUMMARY

In view of the above, an object of the present disclosure is to provide a bushing which solves, or at least mitigates, the problems of the prior art.

There is hence provided a bushing for a power system, comprising: a conductor, and a condenser core, wherein the condenser core comprises a dielectric sheet and a plurality of disjoint regions of electrically conducting material provided on the dielectric sheet, wherein the dielectric sheet and the electrically conducting material form a wound structure around the conductor, wherein in at least one region the electrically conducting material is a semiconducting material, wherein the semiconducting material extends more than one turn around the conductor, whereby the at least one region has overlapping edges in the radial direction, and wherein the dielectric sheet extends between the overlapping edges whereby a capacitance is formed between the overlapping edges, which capacitance is partly defined by an overlap length of the overlapping edges and which capacitance forms part of a resonance circuit of the at least one region, wherein the overlap length is such that the resonance circuit has a resonance frequency contained in a very fast transient, VFT, spectrum.

The bushing hence has a built-in VFT damping capability. Since resonance occurs at a VFT frequency the ohmic heating and thus the absorption capability is increased. The bushing will hence become less vulnerable to transient overvoltages provided the distributed heating power density is low enough not to cause any damage. Additionally, the bushing will also act as a VFT filter—in essence a high frequency band stop filter—thus helping to protect other components in the system as well.

Additionally, the design is robust enough to mechanically and thermally withstand the manufacturing process of the bushing.

The overlap length may be selected based on the frequencies of expected potential VFTs in the power system in which the bushing is to be installed.

The regions of electrically conducting material form a plurality of field-grading layers arranged concentrically around the conductor.

According to one embodiment the resonance frequency is in a range of 0.5 MHz to 10 MHz. Much of the VTF spectrum is concentrated to this range.

According to one embodiment the resonance frequency is in a range of 1 MHz to 10 MHz.

According to one embodiment the semiconducting material has a surface resistance in the range $0.1\text{-}10^3$ Ω/square.

According to one embodiment the surface resistance is in the range $1\text{-}10^3$ Ω/square, preferably $1\text{-}10^2$ Ω/square.

According to one embodiment the electrically conducting material is a semiconducting material in a plurality of the regions, and wherein in each of the plurality of regions comprising a semiconducting material the semiconducting material extends more than one turn around the conductor, whereby each of these regions have overlapping edges in respective radial directions.

According to one embodiment the dielectric sheet extends between each pair of overlapping edges whereby a respective capacitance is formed between the pairs of overlapping edges, which capacitances forms part of a resonance circuit of the respective region, wherein each pair of overlapping edges has different overlap length designed such that each resonance circuit obtains a unique resonance frequency contained in the VFT spectrum.

Hence, a plurality of different potential transient frequencies of VFTs may be filtered out by means of the constructions of the condenser core. Due to the mutual inductive coupling between the individual resonance circuits, as well as the resistive damping, the absorption spectrum will become a relatively smooth function within the frequency range of interest.

According to one embodiment each resonance frequency is in a range of 0.5 to 10 MHz.

According to one embodiment the semiconducting material of each region comprising a semiconducting material has a surface resistance in the range $0.1\text{-}10^3$ $\Omega$/square, preferably $1\text{-}10^3$ $\Omega$/square, such as $1\text{-}10^2$ $\Omega$/square.

According to one embodiment the electrically conducting material in at least one of the regions of electrically conducting material is metal, such as aluminium.

According to one embodiment the dielectric sheet is a cellulose-based material or a film such as a polymer film.

According to one embodiment the regions of electrically conducting material are foils or coatings on the dielectric sheet. In case of foils, the foils may for example be aluminium foils.

According to one embodiment the bushing is a high voltage bushing.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the "element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
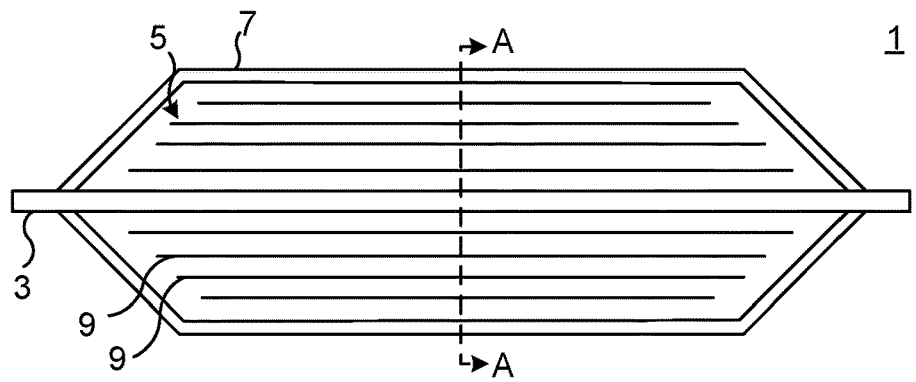
FIG. 1 schematically shows a longitudinal section of an example of a bushing.

FIG. 1 shows an example of a longitudinal section of a bushing 1. The bushing 1 may for example be a medium voltage bushing or a high voltage bushing. The bushing 1 may be designed for use in a power system, such as a power transmission system or a power distribution system.

The exemplified bushing 1 comprises a conductor 3, a condenser core 5, and an external housing 7. The conductor 3 extends centrally through the external housing 7. The conductor 3 is a central conductor and extends along a central longitudinal axis of the bushing 1.

The condenser core 5 is arranged around the conductor 3. The external housing 7 houses the condenser core 5. The condenser core 3 comprises a plurality of layers of regions of electrically conducting material 9 separated by a dielectric material. The layers of electrically conducting material 9 form field-grading layers. The field-grading layers are configured to provide a smooth potential gradient from the conductor 3 to a grounded portion of the bushing 1, typically a grounded flange.

The field-grading layers 9 have an axial extension which decreases with the radial distance from the conductor 3.

The condenser core 5 comprises a dielectric sheet (not shown in FIG. 1) which forms the dielectric material. The dielectric sheet is provided with a plurality of disjoint regions of electrically conducting material 9. Each region of electrically conducting material 9 is preferably arranged on the same side of the dielectric sheet. The dielectric sheet, provided with the regions of electrically conducting material 9 is during manufacturing wound a plurality of turns around the conductor 3, which regions of electrically conducting material 9 thereby form the field-grading layers. The condenser core 5 hence has a wound structure around the conductor 3.

The electrically conducting material may for example be a foil, such as metal foils e.g. aluminium foil. The condenser core 5 may comprise a plurality of foils and each foil may form a respective region of electrically conducting material 9. Alternatively, each electrically conducting region may be a coating provided e.g. by some type of deposition technique for example spraying or physical vapour deposition.

Figure 2:
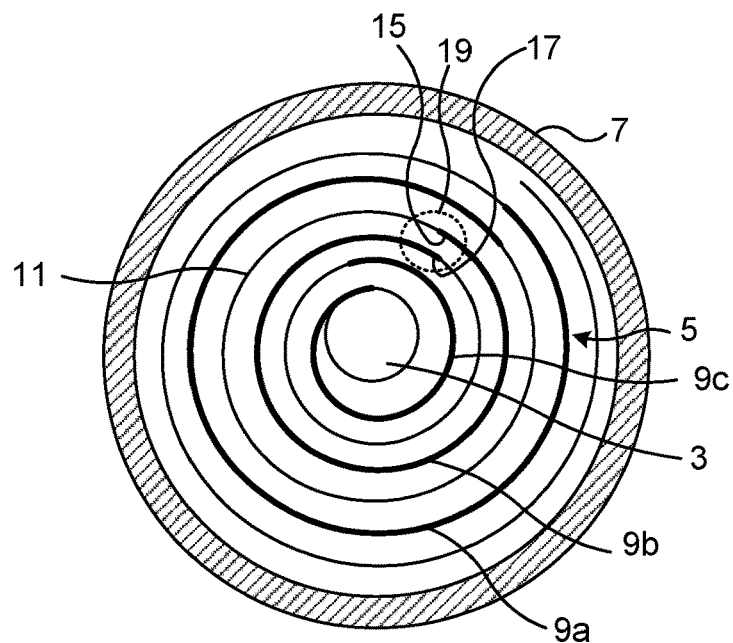
FIG. 2 schematically shows a cross-sectional view along lines A-A in FIG. 1.

FIG. 2 shows a cross-section of the bushing 1 along lines A-A. It can be seen that the condenser core 5 comprises a dielectric sheet 11 provided with regions of 9a, 9b, 9c of electrically conducting material 9. The dielectric sheet 11 is wound around the conductor 3 a plurality of turns. At least one of regions of electrically conducting material 9 is wound more than one turn around the conductor 3. This region hence has overlapping edges or edge portions 15 and 17 of electrically conducting material 9 in the radial direction. Although not clearly visible in the schematic illustration depicted in FIG. 2, due to the wound structure of the condenser core 5, a portion of the dielectric sheet 11 is provided between the two overlapping edges 15 and 17. A capacitive coupling is hence obtained due to the sandwiched configuration of the two overlapping edges 15, 17 of electrically conducting material 9 and the dielectric sheet 11 arranged between the two overlapping edges 15, 17.

Figure 3:
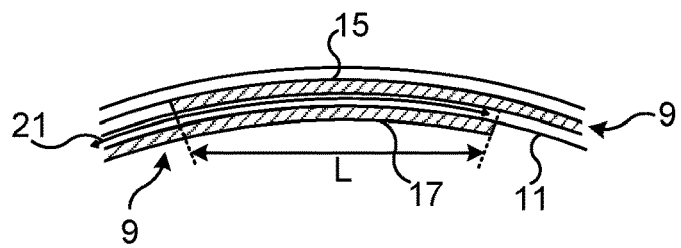
FIG. 3 shows a close-up view of a portion of the bushing in the cross-section in FIG. 2.

FIG. 3 shows a close-up view of the encircled area 19 in FIG. 2. The overlapping edges 15 and 17 have an overlap length L in the azimuth or circumferential direction of the bushing 1. The overlap length L is the distance for which the two edges or edge portions 15 and 17 of the region 9b overlap. A capacitance formed by the capacitive coupling is partly determined by the overlap length L. Hence, in the design stage, the capacitance may be selected based on the overlap length L. The capacitance forms part of a resonance circuit of the region 9b together with the inductance associated with an azimuthal current which in operation of the bushing 1 flows in the azimuth or circumferential direction along the region 9b of electrically conducting material 9, as indicated by arrow 21. Thus, by selecting the overlap length L appropriately, the resonance frequency of the resonance circuit may be tuned to a desired frequency.

The overlap length L of the overlapping edges 15 and 17 is selected such that the resonance frequency of the resonance circuit is in the expected VFT spectrum for the specific application of the bushing 1. For example, the typical shape of an VFT transient pulse is influenced by the specific types of circuit breakers connected to the system. In general, the spectrum of a VFT pulse is determined by its shape, such that the fast rise time gives the upper frequency limit and the slower fall time gives the lower frequency limit. In between these limits the spectral content is a continuous function of frequency. The VFT spectrum is typically contained in the range 0.5 MHz to 10 MHz, such as in the range 1 MHz to 10 MHz.

The electrically conducting material 9 of the region 9b is a semiconducting material. The semiconducting material may have a surface resistance in the range $0.1$-$10^3$ $\Omega$/square, such as in the range $1$-$10^3$ $\Omega$/square, preferably in the range $1$-$10^2$ $\Omega$/square. Examples of possible candidates are different types of thin conducting structures, such as (i) percolated networks of high aspect ratio silver nanowires, (ii) self assembled and sintered nanoparticle films, (iii) etched Physical Vapour Deposition (PVD) films, (iv) printed and sintered nanoparticle films. Also meshes made of very thin metal wires may provide the required surface resistance.

The semiconducting material provides ohmic heating and hence damping. Due to the specifically selected overlap length L, the resonance of the resonance circuit will occur at a VFT frequency and this resonance will be damped by the semiconducting material. Efficient filtering of a VFT with the specific frequency may thereby be provided.

According to one variation, a plurality of the regions 9a-9c may be formed by an electrically conducting material which is a semiconducting material. The semiconducting material of each region 9a-9c may have a surface resistance in the range $0.1$-$10^3$ $\Omega$/square, such as in the range $1$-$10^3$ $\Omega$/square, preferably in the range $1$-$10^2$ $\Omega$/square. Each such region 9a-9c may in this case extend more than a turn around the conductor 3. Thus, each such region 9a-9c will in this case have overlapping edges. The overlap length between these edges may be selected such that each resonance circuit obtains a different resonance frequency contained in the VFT spectrum. In this manner, due to the inductive coupling between the resonance circuits, as well as the resistive damping, a continuous range of VFT frequencies may be attenuated and filtered out. The bushing 1 will in this case act as a multi-frequency band-stop filter.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A bushing for a power system, comprising:
   a conductor, and
   a condenser core comprising a dielectric sheet and a plurality of disjoint regions of electrically conducting material provided on the dielectric sheet, wherein the dielectric sheet and plurality of disjoint regions of the electrically conducting material form a wound structure around the conductor,
   the electrically conducting material in a first region of the plurality of disjoint regions being a semiconducting material extending more than one turn around the conductor,
   the electrically conducting material in the first region having overlapping edges in a radial direction, and
   the dielectric sheet extending between the overlapping edges to form a capacitance between the overlapping edges, which capacitance is partly defined by an overlap length of the overlapping edges and which capacitance forms part of a resonance circuit of the first region together with an inductance associated with an azimuthal current which in operation of the bushing flows in the azimuth or circumferential direction along the first region of electrically conducting material, the overlap length being such that the resonance circuit has a resonance frequency contained in a very fast transient, VFT, spectrum, the resonance frequency being in a range of 0.5 MHz to 10 MHz.

2. The bushing as claimed in claim 1, wherein the resonance frequency is in a range of 1 MHz to 10 MHz.

3. The bushing as claimed in claim 1, wherein the semiconducting material has a surface resistance in the range 0.1-103 $\Omega$/square.

4. The bushing as claimed in claim 1, wherein the semiconducting material has a surface resistance in a range 1-103 $\Omega$/square.

5. The bushing as claimed in claim 1, wherein the electrically conducting material is a semiconducting material in the plurality of disjoint regions, and wherein in each of the plurality of disjoint regions comprising the semiconducting material, the semiconducting material extends more than one turn around the conductor, whereby each of the plurality of disjoint regions have overlapping edges in respective radial direction.

6. The bushing as claimed in claim 5, wherein the dielectric sheet extends between each pair of overlapping edges whereby a respective capacitance is formed between the pairs of overlapping edges, which capacitance forms part of a resonance circuit of the respective disjoint region, wherein each pair of overlapping edges has different overlap length designed such that each resonance circuit obtains a unique resonance frequency contained in the VFT spectrum.

7. The bushing as claimed in claim 6, wherein each resonance frequency is in a range of 0.5 MHz to 10 MHz.

8. The bushing as claimed in claim 6, wherein the semiconducting material of each disjoint region comprises a semiconducting material having a surface resistance in the range 0.1-103 $\Omega$/square.

9. The bushing as claimed in claim 1, wherein the electrically conducting material in at least one of the regions of electrically conducting material is metal.

10. The bushing as claimed in claim 1, wherein the dielectric sheet is a cellulose-based material.

11. The bushing as claimed in claim 1, wherein the regions of electrically conducting material are foils or coatings on the dielectric sheet.

12. The bushing as claimed in in claim 1, wherein the bushing is a high voltage bushing.

13. The bushing as claimed in claim 1, wherein the semiconducting material has a surface resistance in a range 1-102 $\Omega$/square.

14. The bushing as claimed in claim 6, wherein the semiconducting material of each disjoint region comprises a semiconducting material that has a surface resistance in a range 1-103 $\Omega$/square.

15. The bushing as claimed in claim 6, wherein the semiconducting material of each disjoint region comprises a semiconducting material having a surface resistance in a range 1-102 $\Omega$/square.

16. The bushing as claimed in claim 9, wherein the metal is aluminium.

17. The bushing as claimed in claim 1, wherein the dielectric sheet is a polymer film.

\* \* \* \* \*